Oct. 9, 1951   F. ERNY   2,570,534
AERODYNAMIC TRIM MEANS
Filed Nov. 29, 1946
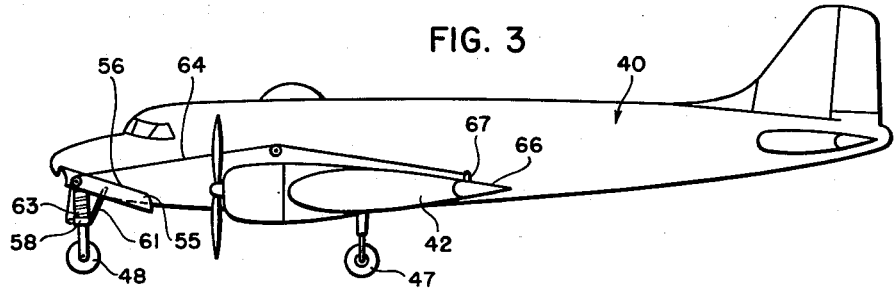
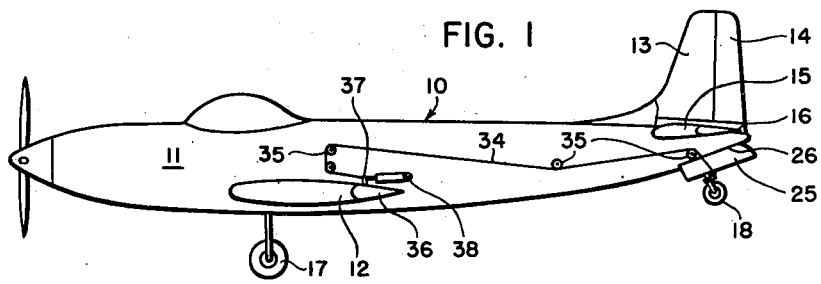
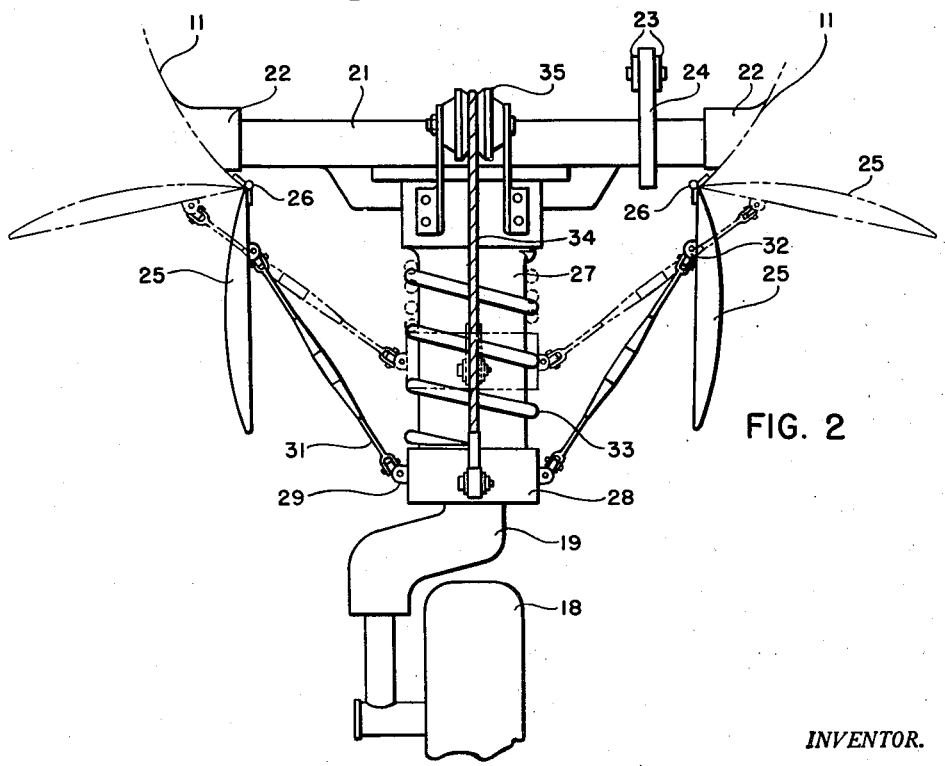
INVENTOR.
FRANK ERNY
BY
*Richard W. Treverton*
ATTORNEY Patented Oct. 9, 1951

2,570,534

UNITED STATES PATENT OFFICE 2,570,534

AERODYNAMIC TRIM MEANS

Frank Erny, Buffalo, N. Y., assignor to Curtiss-Wright Corporation, a corporation of Delaware Application November 29, 1946, Serial No. 712,863

9 Claims. (Cl. 244—42)

This invention relates to aerodynamic trim means for airplanes and more particularly to such means arranged to operate in conjunction with auxiliary lift devices.

When auxiliary lifting devices of the kind now widely used, i. e. wing trailing edge flaps, are brought into operation, pitching moments of substantial magnitude are created. In some cases the lowering of retractable landing gear creates drag forces which are additive to these pitching moments created by the flaps. Since in large aircraft the forces required to counterbalance the total pitching moments may be greater than the airplane pilots can be expected to apply manually to the elevator surfaces, trim tabs are often provided to produce counterbalancing forces. These, however, require operation at the critical time when the pilot has other functions to perform in preparation for landing.

It is an object of the present invention to arrange surfaces, which are required on the airplane for another purpose, in such manner as to automatically provide for aerodynamic counterbalancing of the pitching moments created upon lowering of the flaps.

According to the invention doors for the well into which landing gear is retracted are arranged to function as airfoils upon which aerodynamic forces act oppositely to pitching moments produced by extension of the high lift wing flaps. Means are provided to move the doors into operative position to function as airfoils when the flaps are lowered, so that the aircraft is trimmed for this flight condition automatically and without requiring the attention of the pilot.

The foregoing and other objects and advantages will become apparent from the following description of the typical embodiments of the invention shown in the accompanying drawings, wherein:

Figure 1 is a schematic side elevational view showing the invention applied to an aircraft having its main landing wheels forward of its center of gravity, and provided with a retractable tail wheel;

Figure 2 is a fragmentary rear elevation of the retractable tail wheel and associated parts relating to the invention; and, Figure 3 is a view similar to Figure 1 but showing the invention applied to an aircraft having its center of gravity forward of the main landing wheels and having a retractable nose wheel.

As shown in Figure 1 the airplane 10 comprises fuselage 11, wing 12, vertical fin and rudder 13 and 14, and horizontal stabilizer and elevator 15 and 16. Forward of the airplane's center of gravity are a pair of main landing wheels 17 while to the rear thereof is a tail wheel 18. The latter is retractable, its supporting strut 19 swinging rearwardly about the axis of a tube 21 into a well in the fuselage. The tube 21 is journalled in members 22 that are secured to the fuselage structure 11, and may be partially rotated to effect retraction and extension of the tail wheel by a suitable jack (not shown) pivoted by a clevis 23 to an arm 24 affixed to the tube.

For closing the well when the tail wheel is retracted doors 25 are hinged to the fuselage along hinge axes 26 which lie in a plane that is inclined relative to the longitudinal axis of the airplane.

Movable axially along cylindrical shank 27 of the strut 19 is a collar 28 connected by pivoting and swivelling fittings 29 to links 31 which are also connected by pivoting and swivelling fittings 32 to the doors 25. The collar 28 is urged to the outer end (the end remote from tube 21) of shank 27 by a coil spring 33, but is movable inwardly against the compression of the spring by pull of a cable 34. Such inward movement of the collar, from the full to the broken line position thereof in Figure 2, results in substantial movement of the doors 25. The cable 34, which extends within the aircraft fuselage around a suitable system of pulleys 35, connects the collar to means movable with the high lift flaps 36 that are hinged to the trailing edge of wing 12. The flaps may have an operating lever arm 37 connected to a suitable operating jack 38 within the fuselage, and the cable may be secured to the arm 37.

The jack 38 may be controlled in the usual manner by means (not shown) in the pilot's compartment of the aircraft. It will be understood that, by the arrangement described, when the jack is retracted to swing the flaps 36 downwardly, i. e. clockwise in Figure 2, about the axis of their hinge connection to the trailing edge of the wing, a pull will be exerted on the cable 34.

The links 31 preferably include turnbuckle means to enable accurate adjustments of their effective lengths. When the tail wheel is extended the links lie in a plane that is nearly normal to the plane which embraces hinge axes 26. Therefore upon retraction of the wheel and strut, during which these parts move about the axis of tube 21, the doors are drawn together by the links 31 to bring their lower edges into abutting relation to close the wheel well. In the full line position of the doors shown in Figure 2, which is also the position depicted in Figure 1, the doors are substantially upright; but upon inward movement of the collar effected by cable 34 they are swung by the links to the broken line position.

In operation of the aircraft with the flaps 36 raised, i. e. in the retracted position shown in Figure 1, the doors 25 will be closed when the landing gear is retracted. They will be in the open, upright position shown in Figure 1 and in full lines in Figure 2 when the gear is extended. In either case the doors will have little effect upon the trim of the aircraft about its pitching axis. When the flaps 36 are extended into high lift position, i. e. lowered, so that the center of pressure is moved rearwardly, thereby introducing a substantial forward pitching moment, the doors are swung to their position of lateral extension from the fuselage shown in broken lines in Figure 2. In this position, due to the inclination of hinge axis 26, the doors have a negative angle of incidence relative to the longitudinal axis of the airplane, resulting in aerodynamic down forces for counterbalancing the forward pitching moment. Accordingly the doors when extended constitute airfoils which trim the aircraft for flight with the flaps in extended position. It will be understood that the magnitude of the counterbalancing force created by doors of given area may be varied appreciably by adjusting the maximum upward swinging movement of the doors about their hinge axes 26.

In Figure 3 the same principles as described in connection with Figures 1 and 2 are applied to an airplane of the tricycle gear type, wherein the longitudinal position of the center of gravity is between the main gear 47 and nose gear 48. The latter retracts into a well in the aircraft nose which may then be closed by doors 55. Movement of the doors to a substantially horizontal position in which they function as airfoils is effected by a collar 58 and links 61, which may be similar to collar 28 and links 31 heretofore described, being acted upon by a coil spring 63, similar in function to spring 33, and by a cable 64. The cable extends to an arm 67 movable with flaps 66 which are hinged to the trailing edge of the wing 42. The primary difference in the arrangement shown in Figure 3 from that of Figure 1 is that the hinge axes 56 of doors 55 are inclined oppositely to axes 26 of doors 25, so that when fully extended doors 55 have a positive instead of negative angle of incidence. In this arrangement aerodynamic forces on the extended doors produce an upward force component at a point forward of the pitching axis, thereby producing the same counterbalancing effect that the doors 25 produce by a downward component rearward of the pitching axis.

It will be understood that the structures and arrangements of parts described and shown herein are merely to illustrate the inventive principles involved, and that these principles may be otherwise embodied without departing from the spirit of the invention or from the scope of the appended claims.

I claim:

1. In an airplane having a wing and fuselage, a high lift flap associated with the wing for movement between extended and retracted positions, a landing gear retractable into a well in the fuselage at a point spaced longitudinally from the wing, doors for said well hinged to extend laterally from the fuselage when in extended position, said doors when so extended constituting airfoils for trimming the aircraft for flight with said flap in extended position, and means operatively connecting said doors and said flap for moving said doors to said extended position upon extension of said flap.

2. In an airplane having a wing and fuselage, high lift means associated with the wing, actuating means for rendering said high lift means operative or inoperative, a landing gear retractable into a well in the fuselage at a point spaced longitudinally from the center of pressure of the wing, a door for said well arranged to move from well closing position to an extended position wherein it constitutes an airfoil for counterbalancing pitching moments resulting from said high lift means being rendered operative, and means operatively connecting said actuating means with said door for moving the latter to said extended position upon said high lift means being rendered operative.

3. In an airplane having a well in the fuselage thereof for receiving a retractable landing gear, a pair of doors hinged to the fuselage at the sides of said well, means for operating the doors to closed positions upon retraction of the landing gear and to substantially upright open positions upon extension of the landing gear, and pilot operable means for operating the doors independently of landing gear movement from said substantially open positions to further open positions in which they extend laterally from the fuselage to constitute auxiliary airfoils.

4. In an airplane having a fuselage provided with a well for a retractable landing gear, a pair of doors hinged to the fuselage at the sides of the well, means connecting said landing gear and said doors for moving the latter from closed position to an open position sufficient to pass the landing gear upon extension thereof and in which the doors depend substantially vertically from the fuselage, and pilot operable means operating independently of landing gear movement for moving said connecting means relative to the landing gear to further open said doors to positions wherein they extend laterally from the fuselage to constitute auxiliary airfoils.

5. In an airplane having a fuselage and wing, a lift increasing flap on the wing, the fuselage having a well for a retractable landing gear and doors for said well hinged at the opposite sides thereof, means operable upon extension of the landing gear to open said doors sufficiently to pass the landing gear, and means operable upon movement of said flaps to operative position for further opening said doors independently of landing gear movement to positions wherein said doors extend laterally from the fuselage to constitute auxiliary airfoils.

6. In an airplane having a fuselage and wing, a lift increasing flap on the wing, the fuselage being provided with a well for a retractable landing gear and having a pair of doors hinged thereto at opposite sides of the well, means connecting said landing gear and said doors for moving the latter from closed position to an open position sufficient to pass the landing gear upon extension thereof, and means operable upon movement of said flap to operative position for moving said connecting means relative to the landing gear to further open said doors.

7. In an airplane having a retractable landing gear and a well therefor, a pair of doors hinged to the fuselage at opposite sides of the well, the landing gear comprising a strut hinged for retracting and extending movements on an axis substantially transverse of the door hinge axes, a member and means for moving it along the strut toward and away from said strut hinge axis, and a link for each door having a universal connection to the door and to the member, the doors being moved by said links from closed to partially open position for passing the landing gear upon extending movement of the strut, and the doors being further opened by said links upon movement of said member toward said strut hinge axis.

8. In an airplane having a fuselage and a wing, a lift increasing flap on the wing and means to operate said flap between retracted and extended positions, a retractable landing gear and a well therefor in said fuselage, a pair of doors hinged to the fuselage at opposite sides of the well, the landing gear comprising a strut hinged for retracting and extending movements on an axis substantially transverse of the door hinge axes, a member and means for moving it along the strut upon movement of said flap, said member being moved toward said strut hinge axis upon extension of the flap, a link for each door having a universal pivot connection to the door and to the member, the doors being moved by said links from closed to partially open position for passing the landing gear upon extending movement of the strut, and the doors being further opened by said links for trimming the aircraft upon movement of said member toward said strut hinge axis.

9. In an airplane having a fuselage and a wing, a lift increasing flap on the wing and means to operate said flap between retracted and extended positions, a retractable landing gear and a well therefor in the fuselage, a pair of doors hinged to the fuselage on substantially longitudinal axes at the opposite sides of the well, the landing gear comprising a strut hinged on a substantially transverse axis for retracting or extending movement, a member movable along the strut, spring means for moving the member along the strut away from said transverse axis, cable means for moving the member in the opposite direction upon extension of the flap, a link for each door having a universal pivot connection to the door and to the member, the doors being moved by said links from closed to partially open position for passing the landing gear upon extending movement of said strut, and the doors being further opened by said links for trimming the aircraft upon movement of said member in said opposite direction.

FRANK ERNY.

REFERENCES CITED

The following references are of record in the file of this patent:

UNITED STATES PATENTS

| Number | Name | Date |
|---|---|---|
| 2,189,553 | Schut | Feb. 6, 1940 |
| 2,222,975 | Brown | Nov. 26, 1940 |
| 2,262,968 | Schmidt et al. | Nov. 18, 1941 |
| 2,279,615 | Bugatti | Apr. 14, 1942 |
| 2,296,117 | Pevney | Sept. 15, 1942 |
| 2,362,919 | Miller | Nov. 14, 1944 |
| 2,371,699 | Martin | Mar. 20, 1945 |
| 2,425,306 | Conner | Aug. 12, 1947 |
| 2,431,536 | Bland | Nov. 25, 1947 |

OTHER REFERENCES

"Janes All the World's Aircraft," for 1942, pages 172c and 173c.